United States Patent
Tsutsumi et al.

(10) Patent No.: US 11,379,536 B2
(45) Date of Patent: Jul. 5, 2022

(54) CLASSIFICATION DEVICE, CLASSIFICATION METHOD, GENERATION METHOD, CLASSIFICATION PROGRAM, AND GENERATION PROGRAM

(71) Applicant: Rakuten Group, Inc., Tokyo (JP)

(72) Inventors: Makoto Tsutsumi, Tokyo (JP); Koji Murakami, Tokyo (JP); Takashi Umeda, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 318 days.

(21) Appl. No.: 16/486,660

(22) PCT Filed: May 21, 2018

(86) PCT No.: PCT/JP2018/019554
§ 371 (c)(1),
(2) Date: Aug. 16, 2019

(87) PCT Pub. No.: WO2019/224891
PCT Pub. Date: Nov. 28, 2019

(65) Prior Publication Data
US 2021/0334309 A1    Oct. 28, 2021

(51) Int. Cl.
*G06F 7/02* (2006.01)
*G06F 16/00* (2019.01)
(Continued)

(52) U.S. Cl.
CPC ...... *G06F 16/906* (2019.01); *G06F 16/90332* (2019.01); *G06F 16/93* (2019.01); *G06N 20/00* (2019.01)

(58) Field of Classification Search
CPC .. G06F 16/906; G06F 16/93; G06F 16/90332; G06F 16/958; G06F 40/40;
(Continued)

(56) References Cited

U.S. PATENT DOCUMENTS 8,000,956 B2 * 8/2011 Brun .................. G06F 40/295
704/9
2019/0005020 A1 * 1/2019 Gregory .............. G06V 10/457
(Continued)

OTHER PUBLICATIONS

Yamada, Ikuya, et al, "Joint Learning of the Embedding of Words and Entities for Named Entity Disambiguiation," Proceedings of 20th SIGNLL Conference on Computational Conference on Natural Language Learning (CoNLL), pp. 250-259, Aug. 7-12, 2016. (Year: 2016).*

(Continued)

*Primary Examiner* — Bruce M Moser
(74) *Attorney, Agent, or Firm* — Sughrue Mion, PLLC

(57) ABSTRACT

Even when there are many candidates for a linked entity, accuracy of estimating an entity related to a term that appears on given writing is improved. A classification device stores a first model generated by using a corpus including pieces of first writing related to predetermined entities, and a second model generated by using a corpus including the pieces of first writing. Features of terms included in the first writing are acquired from the first model. Features of the pieces of first writing are acquired from the second model. The classification device causes the first model to output first information indicating entities indicated by terms, which has similarity in a feature to a second term included in second writing, among first terms indicating the predetermined entities. The classification device causes the second model to output second information indicating entities related to pieces of writing, which has similarity in a feature to the second writing, among the pieces of first writing. The classification device determines linking of the second term based on the first information and the second information.

12 Claims, 7 Drawing Sheets

(51) Int. Cl.
*G06F 16/906* (2019.01)
*G06F 16/93* (2019.01)
*G06F 16/9032* (2019.01)
*G06N 20/00* (2019.01)

(58) Field of Classification Search
CPC ...... G06F 40/30; G06F 40/295; G06F 40/131; G06F 40/117; G06N 20/00
See application file for complete search history.

(56) References Cited

U.S. PATENT DOCUMENTS

2019/0042551 A1* 2/2019 Hwang ................ G06N 3/0454
2020/0167293 A1* 5/2020 Pandya ............... G06F 12/0246

OTHER PUBLICATIONS

Moreno Jose et al, "Combining Word and Entity Embeddings for Entity Linking," Proceedings of the European Semantic Web Conference, pp. 337-352, May 31, 2017. (Year: 2017).*
Louis Kirsch et al., "Named Entity Linking using Paragraph Vector", Paper for Seminar, Knowledge Mining, Aug. 31, 2016, 23 pgs., Hasso Plattner Institute, Potsdam University.

* cited by examiner

| METHOD | | ACCURACY (%) |
|---|---|---|
| TEXT-MATCHING | | 52.5 |
| Doc2Vec IN ONE STAGE | PARAGRAPH VECTOR | 46.0 |
| | WORD VECTOR | 71.5 |
| Doc2Vec IN TWO STAGE | FIRST STAGE: PARAGRAPH VECTOR SECOND STAGE: WORD VECTOR | 61.5 |
| | FIRST STAGE: WORD VECTOR SECOND STAGE: PARAGRAPH VECTOR | 78.5 |
| | FIRST STAGE: WORD VECTOR SECOND STAGE: PARAGRAPH VECTOR (NOT INCLUDING COMPANY NAMES) | 83.5 |

# CLASSIFICATION DEVICE, CLASSIFICATION METHOD, GENERATION METHOD, CLASSIFICATION PROGRAM, AND GENERATION PROGRAM

CROSS REFERENCE TO RELATED APPLICATIONS

This application is a National Stage of International Application No. PCT/JP2018/019554 filed May 21, 2018.

TECHNICAL FIELD

The present invention is related to a technical field of machine learning and is specifically related to a technical field of a classification device, a classification method, and a generation method of a classifier, to estimate for which meaning a term appearing on specific writing is used.

BACKGROUND ART

Meaning of a term having polysemy is vague from the term itself. Thus, conventionally, a technology of estimating, by machine learning using many pieces of writing, for which meaning a term used in certain writing is used in a context of the writing has been known.

For example, in Non Patent Literature 1, a method of linking an entity expressed in language to an entity having specific meaning on a knowledge base by using Doc2Vec is disclosed. In this method, by leaning using pages of entities to be candidates in a web-based encyclopedia, a model is generated from which paragraph vectors of the candidates are acquired. By using this model, a paragraph vector of writing including a term to be linked is estimated, and a candidate, from which a paragraph vector having high similarity to the paragraph vector of this writing is acquired, is estimated as an entity linked to the term.

CITATION LIST

Non Patent Literature

Non Patent Literature 1: Louis Kirsch, and three others "Named Entity Linking using Paragraph Vector," Accessed 25 Apr. 2018, http://louiskirsch.com/res/nel_paragraph_vector.pdf

SUMMARY OF INVENTION

Technical Problem

However, when there are many entities to be candidates for an entity related to the entity expressed in the language, it is difficult to accurately perform linking by the one-stage classification disclosed in Non Patent Literature 1 even when there are enough documents for learning.

The present invention is provided in view of the forgoing point and is to provide a classification device, a classification method, a generation method, a classification program, and a generation program to improve accuracy of estimating an entity related to a term appearing on given writing even when there are many candidates for the entity related to the term.

Solution to Problem

An exemplary embodiment may include a classification device comprising: a storage means that stores a first model which is generated by machine learning using a corpus including one or more pieces of first writing related to one or more respective predetermined entities and from which features of terms included in the one or more pieces of first writing are acquired, and a second model which is generated by machine learning using a corpus including the one or more pieces of first writing and from which features of the one or more pieces of first writing are acquired; a first control means that causes the stored first model to output, in response to an input of a second term that is included in given second writing and is an object of linking, first information indicating one or more entities indicated by one or more respective terms, which have similarity in a feature to the second term, among one or more first terms indicating the one or more predetermined respective entities; a second control means that causes the stored second model to output, in response to an input of the second writing, second information indicating one or more entities related to one or more respective pieces of writing, which have similarity in a feature to the second writing, among the one or more pieces of first writing; and a determination means that determines linking of the second term based on the output first information and the output second information.

According to this invention, linking of a second term is determined based on both of similarity in a feature of a term acquired from a first model and similarity in a feature of writing acquired from a second model. Thus, even when there are many candidates for an entity related to a second term, accuracy of estimating the entity related to the second term appearing on second writing can be improved.

An exemplary embodiment may include a classification device wherein the second control means causes the second model generated by using a corpus, in which the one or more first terms are removed from the corpus used for generation of the first model, to output the second information.

According to this invention, since first terms indicating entities are removed, a feature based on wider context can be acquired with respect to first writing by the second model at a distance from the first terms itself. Thus, it is possible to appropriately extract an entity in which a feature of related first writing is similar to a feature of second writing.

An exemplary embodiment may include a classification device wherein the corpus used for generation of the second model is identical to the corpus used for generation of the first model, the first control means causes one model, which is generated as a model corresponding to the first model and the second model and from which both of features of terms included in the one or more pieces of first writing and features of the one or more pieces of first writing are acquired, to output the first information, and the second control means causes the one model to output the second information.

According to this invention, since it is only necessary to generate one model, it is possible to reduce learning time compared to a case where both of a model for features of terms and a model for features of writing are generated. In addition, it is possible to reduce time and effort to prepare a corpus.

An exemplary embodiment may include a classification device wherein the second control means causes the second model to output the second information indicating an entity related to writing, which has relatively high similarity in a feature to the second writing, among first documents related to entities indicated by the first information output from the first model, and the determination means determines linking of the second term based on the second information According to this invention, when accuracy of extracting entities truly related to a second term as candidates for a related entity is higher in a first model than in a second model, it is possible to improve final estimation accuracy.

An exemplary embodiment may include a classification device wherein features of terms included in the one or more pieces of first writing is acquired in a unit of a word from the first model, and the first model calculates, when the second term includes a plurality of words, a feature of the second term by a predetermined arithmetic operation with respect to features of the plurality of respective words.

According to this invention, it is possible to acquire a feature of a second term even when the second term itself is not included in a corpus for learning.

An exemplary embodiment may include a classification device wherein when outputting the second information, the second model acquires a feature of the second writing by machine learning using the second writing.

According to this invention, it is possible to acquire a feature of second writing even when a corpus for learning does not include writing identical to the second writing.

An exemplary embodiment may include a classification method performed by a computer, the method comprising: a first storing step of storing, in a storage means, a first model which is generated by machine learning using a corpus including one or more pieces of first writing related to one or more respective predetermined entities and from which features of terms included in the one or more pieces of first writing are acquired; a second storing step of storing, in the storage means, a second model which is generated by machine learning using a corpus including the one or more pieces of first writing and from which features of the one or more pieces of first writing are acquired; a first control step of causing the stored first model to output, in response to an input of a second term that is included in given second writing and is an object of linking, first information indicating one or more entities indicated by one or more respective terms, which have similarity in a feature to the second term, among one or more first terms indicating the one or more predetermined respective entities; a second control step of causing the stored second model to output, in response to an input of the second writing, second information indicating one or more entities related to one or more respective pieces of writing, which have similarity in a feature to the second writing, among the one or more pieces of first writing; and a determining step of determining linking of the second term based on the output first information and the output second information.

An exemplary embodiment may include a generation method executed by a computer, the method comprising: a first generating step of generating, by machine learning using a corpus including one or more pieces of first writing related to one or more respective predetermined entities, a first model from which features of terms included in the one or more pieces of first writing are acquired; a second generating step of generating a second model, from which features of the one or more pieces of first writing are acquired, by machine learning using a corpus including the one or more pieces of first writing; and a third generating step of generating a classifier including a determination unit that determines linking of a second term that is included in given second writing and is an object of linking among the one or more predetermined entities, the first model and the second model, wherein the first model outputs, in response to an input of the second term, first information indicating one or more entities indicated by one or more respective terms, which have similarity in a feature to the second term, among one or more first terms indicating the one or more predetermined respective entities, the second model outputs, in response to an input of the second writing, second information indicating one or more entities related to one or more respective pieces of writing, which have similarity in a feature to the second writing, among the one or more pieces of first writing, and the determination unit determines linking of the second term based on the output first information and the output second information.

An exemplary embodiment may include a classification program for causing a computer to function as: a storage means that stores a first model which is generated by machine learning using a corpus including one or more pieces of first writing related to one or more respective predetermined entities and from which features of terms included in the one or more pieces of first writing are acquired, and a second model which is generated by machine learning using a corpus including the one or more pieces of first writing and from which features of the one or more pieces of first writing are acquired; a first control means that causes the stored first model to output, in response to an input of a second term that is included in given second writing and is an object of linking, first information indicating one or more entities indicated by one or more respective terms, which have similarity in a feature to the second term, among one or more first terms indicating the one or more predetermined respective entities; a second control means that causes the stored second model to output, in response to an input of the second writing, second information indicating one or more entities related to one or more respective pieces of writing, which have similarity in a feature to the second writing, among the one or more pieces of first writing; and a determination means that determines linking of the second term based on the output first information and the output second information.

An exemplary embodiment may include a generation program for causing a computer to function as: a first generating means that generates, by machine learning using a corpus including one or more pieces of first writing related to one or more respective predetermined entities, a first model from which features of terms included in the one or more pieces of first writing are acquired; a second generating means that generates a second model, from which features of the one or more pieces of first writing are acquired, by machine learning using a corpus including the one or more pieces of first writing; and a third generating means that generates a classifier including a determination unit that determines linking of a second term that is included in given second writing and is an object of linking among the one or more predetermined entities, the first model and the second model, wherein the first model outputs, in response to an input of the second term, first information indicating one or more entities indicated by one or more respective terms, which have similarity in a feature to the second term, among one or more first terms indicating the one or more predetermined respective entities, the second model outputs, in response to an input of the second writing, second information indicating one or more entities related to one or more respective pieces of writing, which have similarity in a feature to the second writing, among the one or more pieces of first writing, and the determination unit determines linking of the second term based on the output first information and the output second information.

Advantageous Effects of Invention

According to the present invention, it is possible to improve accuracy of estimating an entity related to a term appearing on given writing even when there are many candidates for the entity related to the term.

DESCRIPTION OF EMBODIMENTS

In the following, an embodiment of the present invention will be described in detail with reference to the drawings. The embodiment described in the following is an embodiment of a case where the present invention is applied to a classification device that generates a classifier and links a term included in given writing to an entity by using this classifier. Note that a device that generates a classifier and a device that executes linking may be different devices.

[1. Configuration of Classification Device]

Figure 1A:
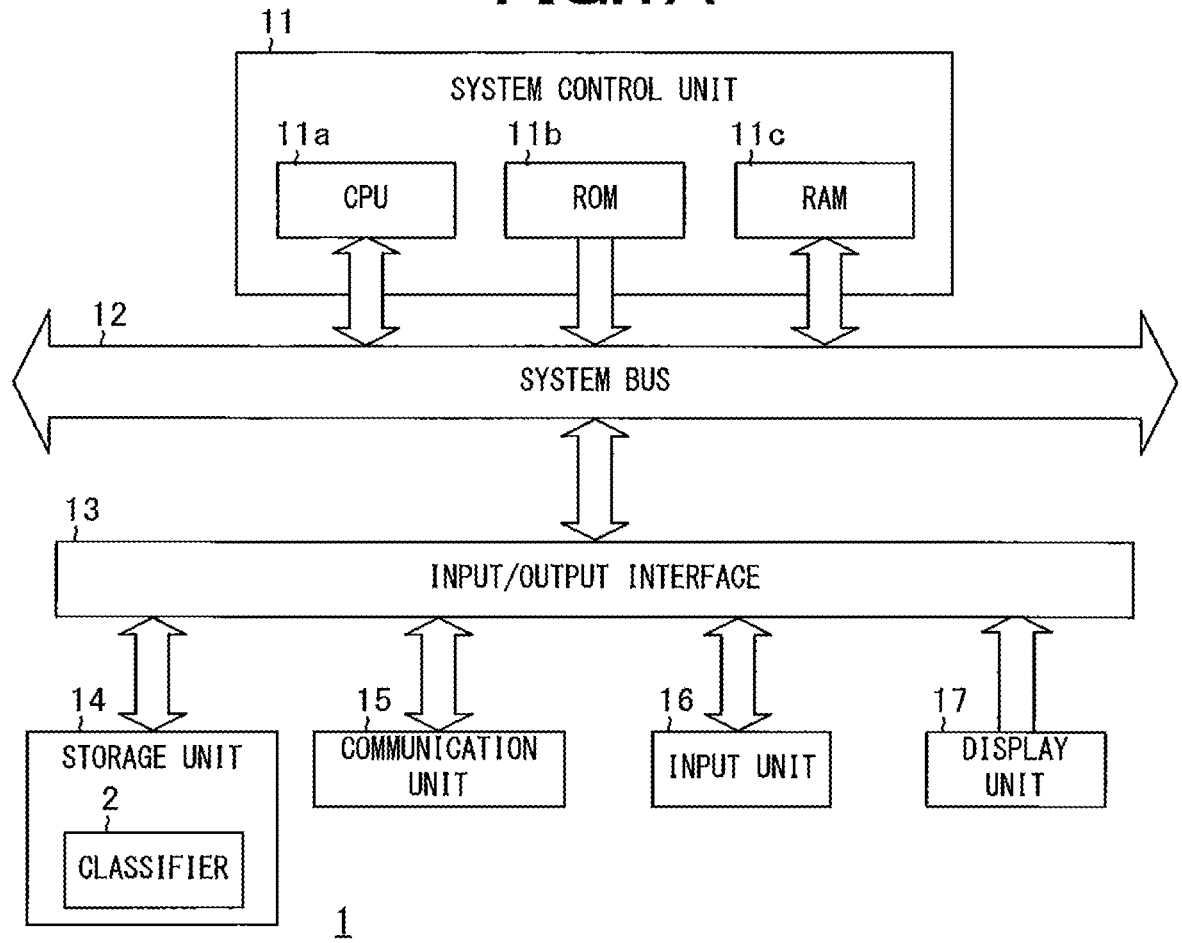
FIG. 1A is a block diagram illustrating an example of an outline configuration of a classification device 1 according to one embodiment.

First, a configuration of a classification device 1 will be described with reference to FIG. 1A. FIG. 1A is a block diagram illustrating an example of an outline configuration of a classification device 1 according to the present embodiment. As illustrated in FIG. 1A, the classification device 1 includes a system control unit 11, a system bus 12, an input/output interface 13, a storage unit 14, a communication unit 15, an input unit 16, and a display unit 17. The system control unit 11 and the input/output interface 13 are connected through the system bus 12.

The system control unit 11 includes a central processing unit (CPU) 11a, a read only memory (ROM) 11b, a random access memory (RAM) 11c, and the like. The CPU 11a is an example of a processor. Note that the present invention can be also applied to various processors different from the CPU. Each of the storage unit 14, the ROM 11b, and the RAM 11c is an example of a memory. Note that the present invention can be also applied to various memories different from a hard disk, the ROM and the RAM.

The input/output interface 13 performs interface processing between the storage unit 14 to the display unit 17 and the system control unit 11.

The storage unit 14 includes, for example, a hard disk drive, a solid-state drive, or the like. This storage unit 14 stores corpora as learning data used in generation of the classifier 2, the generated classifier 2, and the like. The corpora may be acquired through a network, or may be recorded in a recording medium such as an optical disk, a memory card, or a magnetic tape and read through a drive device. Note that when a device that generates the classifier 2 and a device that executes linking are different devices, the generated classifier 2 may be delivered through a network or through a recording medium. In the storage unit 14, an operating system, a program for classifier generation, a program for linking, and the like are further stored. For example, various programs may be acquired from a predetermined server device or the like through a network, or may be recorded in a recording medium and read through a drive device.

The communication unit 15 is connected to a different computer through a network such as the Internet or a local area network (LAN) and controls a state of communication with the computer.

The input unit 16 receives operation by an operator and outputs a signal corresponding to operation contents to the system control unit 11. Examples of the input unit 16 include a keyboard, a mouse, a touch panel, and the like.

The display unit 17 displays information such as an image or a character by control by the system control unit 11. The display unit 17 includes, for example, a graphics processing unit (GPU), a video RAM (VRAM), a display panel, and the like. Examples of the display panel include a liquid crystal panel, an organic light emitting (EL) panel, and the like.

[2. Outline of Function of System Control Unit of Classification Device]

Figure 1B:
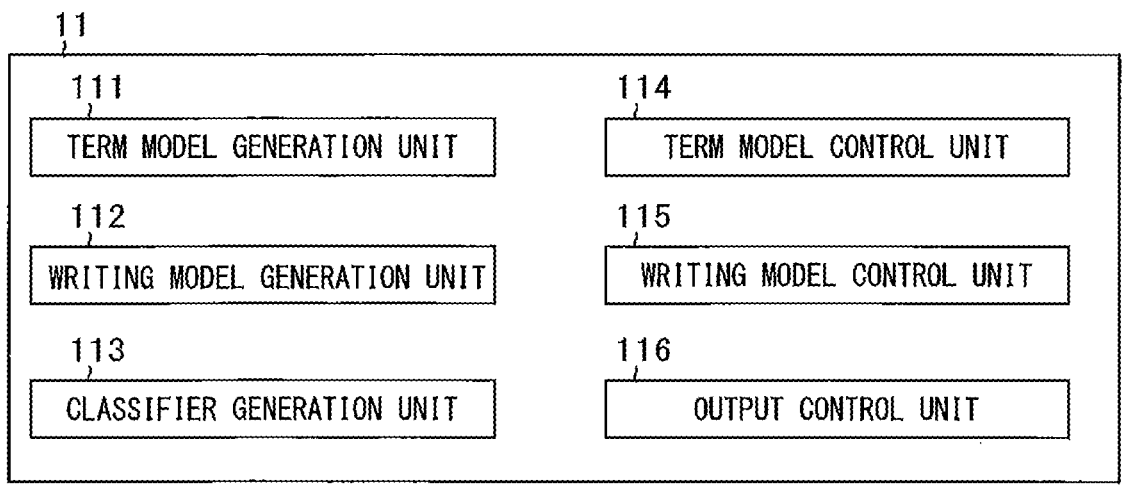
FIG. 1B is a view illustrating an example of a functional block of a system control unit 11 of the classification device 1 according to the one embodiment.

Next, an outline of a function of the system control unit 11 will be described with reference to FIG. 1B to FIG. 3. FIG. 1B is a view illustrating an example of a function block of the system control unit 11 of the classification device 1 according to the present embodiment. When the CPU 11a reads and executes various codes and the like included in a program stored in the storage unit 14, the system control unit 11 functions as a term model generation unit 111, a writing model generation unit 112, a classifier generation unit 113, a term model control unit 114, a writing model control unit 115, an output control unit 116, and the like as illustrated in FIG. 1B.

[2-1. Generation of Classifier]

In the embodiment, given writing that is input into classifier 2 is referred to as "object writing." A certain term that is included in the object writing and is input into classier 2 is referred to as an "object term." An entity that is related to the object term is referred to as a "related entity." Previously-determined one or more entities that each may become candidates for the related entity are referred to as "predetermined entities." In execution of linking, when the object writing and the object term are input, the classifier 2 outputs information indicating the related entity among the predetermined entities. For example, the classifier 2 is used to identify, as the related entity, an entity substantially identical to an entity indicated by the object term (hereinafter, referred to as "object entity") or to identify, as the related entity, an entity having some kind of relevance to the object entity semantically, systematically, socially or the like. Even an entity indicated by a term having a notation or a reading completely different from that of the object term may be identified as the related entity. Moreover, even an entity indicated by a term having a notation or a reading identical or similar to that of the object term may not be identified as the related entity.

The object writing may be, for example, writing referring to the object entity. In a case where the object entity is a person, an organization, a corporation, or the like, the object writing may be writing created or described by the object entity. The object writing may include a term indicating the object entity. Note that "writing" in the present embodiment indicates both of a single piece of writing and a document including one or more pieces of writing.

In a case where linking of the object term and a predetermined entity in the above-described manner is performed, there are the following problems. A first problem is due to a possibility that a term has polysemy. That is, there is a case where terms having an identical notation indicate different entities depending on contexts of the terms when they appear on different pieces of writing. It is demanded to link such a term to an appropriate entity. A second problem is due to a case where an entity itself that may become a candidate of linking has ambiguity or is interpreted broadly. That is, there is a case where a certain entity is linked to a plurality of terms having different notations. For example, entities indicated by a plurality of respective different terms belong to an identical entity or are subordinate concepts of the entity. It is demanded to link such a plurality of terms to appropriate one entity. A third problem is caused since it is previously uncertain whether an entity related to the object term exists in entities that may become candidates of linking. That is, both of a case where there is an entity truly related to an object term in predetermined entities and a case where there is not are possible. In such a situation, it is demanded to appropriately estimate whether there is an entity related to an object term.

Figure 2:
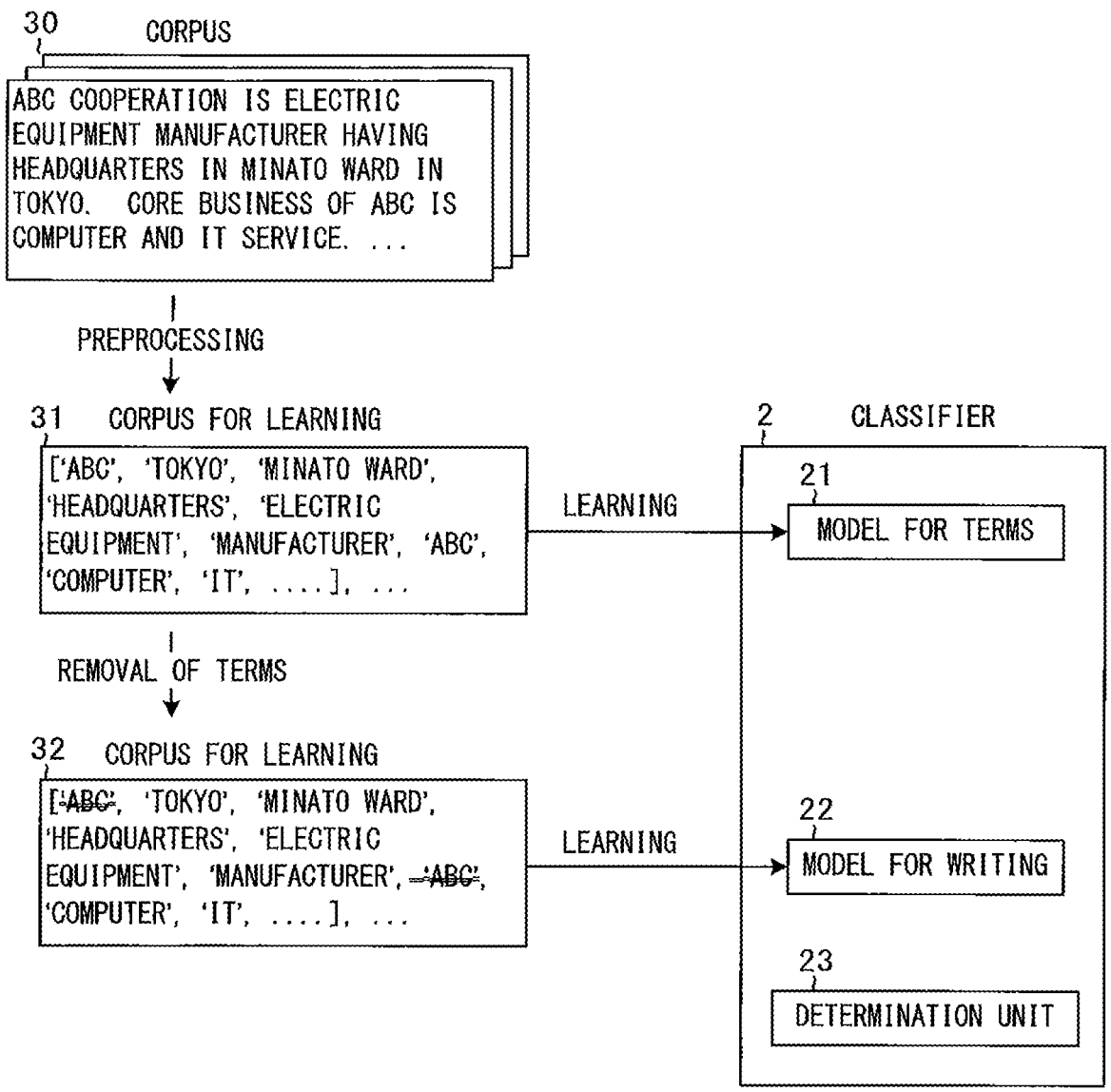
FIG. 2 is a view illustrating an example of a generation method of a classifier 2.

FIG. 2 is a view illustrating an example of a generation method of a classifier 2. As illustrated in FIG. 2, the classifier 2 includes a model for terms 21, a model for writing 22, and a determination unit 23. By the term model generation unit 111 to the classifier generation unit 113, the model for terms 21 to the determination unit 23 are generated.

Based on operation by an operator, the classification device 1 acquires a corpus 30 as data for machine learning for generation of the model for terms 21 and the model for writing 22. The corpus 30 includes one or more pieces of writing related to one or more predetermined respective entities. Writing related to a predetermined entity may be, for example, writing referring to the predetermined entity or writing created or described by the predetermined entity. Each piece of writing may include a term indicating a corresponding predetermined entity. An acquisition source of the corpus 30 is not specifically limited, and examples of an acquisition source include websites such as a web-based encyclopedia on which a web page related to each predetermined entity is posted, an online shopping site, an SNS site, sites referring to predetermined entities, sites run by predetermined entities, a database in which writing data related to each predetermined entity is accumulated, and the like. Each piece of writing in the acquired corpus 30 is associated with each predetermined entity.

The classification device 1 acquires a corpus for learning 31 by preprocessing the corpus 30. For example, by morphological analysis, writing in the corpus 30 is written with a space between words, nouns are extracted, and the extracted term is normalized. When a certain name includes a plurality of words (or morpheme), it is preferably divided into the plurality of words and extracted in a form of this plurality of words. However, even when a term indicating a predetermined entity includes a plurality of words, て え term itself indicating the predetermined entity may be included in the corpus for learning 31 without being divided. Moreover, the corpus for learning 31 is generated by a removal of stop words from the corpus 30, for example. The preprocessing may be executed based on operation by the operator or may be automatically executed by the classification device 1.

By executing machine learning using the corpus for learning 31, the term model generation unit 111 generates a model for terms 21 from which features of terms included among one or more pieces of writing related to one or more predetermined respective entities are acquired. A feature of a term is based, for example, on a context in which the term is used or terms used around the term. Features of semantically close terms or terms with high relevance tend to be similar. The feature of the term may be indicated, for example, by a word vector that is distributed representation. Although it is not limited to a particular model as long as a feature of each term included in the corpus is acquired, the model for terms 21 is preferably Word2Vec and is more preferably Doc2Vec. In a case of Word2Vec, any of a skip-gram and a continuous bag of words (CBoW) may be used. In a case of Doc2Vec, any of a paragraph vector with distributed memory (PV-DM) and a paragraph vector with distributed bag of words (PV-DBOW) may be used. As a method of machine learning of the model for terms 21, for example, a general method in PV-DM, PV-DBOW, or the like may be used. In execution of linking, the model for terms 21 outputs, in response to an input of an object term, first candidate information indicating one or more entities having similarity in a feature to the object term among terms indicating one or more predetermined respective entities. Note that the machine learning may be executed by a GPU.

By executing machine learning using the corpus for learning 31 (or corpus for learning 32 described later), the writing model generation unit 112 generates a model for writing 22 from which features of one or more pieces of writing related to one or more predetermined respective entities is acquired. A feature of writing is based, for example, on a context in which each term included in the writing is used or terms used around each term. The feature of the writing is indicated, for example, by a paragraph vector that is distributed representation. Although it is not limited to a particular model as long as a feature of each piece of writing included in the corpus is acquired, the model for writing 22 is preferably Doc2Vec. In a case of Doc2Vec, any of PV-DM and PV-DBOW may be used. As a method of machine learning of the model for writing 22, for example, a general method in PV-DM, PV-DBOW, or the like is used. In execution of linking, the model for writing 22 outputs, in response to an input of the object writing, second candidate information indicating one or more entities related to writing, which have similarity in a feature to the object writing, among pieces of writing related to one or more predetermined respective entities.

The writing model generation unit 112 may generate the model for writing 22 by executing machine learning by using the corpus for learning 32, in which at least one of a term indicating a corresponding predetermined entity and an object term is removed from each piece of writing included in the corpus for learning 31, instead of the corpus for learning 31. Accordingly, the corpus for learning 31 and the corpus for learning 32 having different abstraction levels of terms or information included in writing are used. That is, an abstraction level of the corpus for learning 32 is higher than that of the corpus for learning 31. Writing may include information of different abstraction levels. When a person interprets a meaning of a certain term having polysemy in the writing, a meaning of the term is considered by an overview of a wider context at a distance from the term itself. This point of interpreting a meaning of a term from a wider context at a distance from the term itself is realized by machine learning using the corpus for learning 32 from which at least one of terms indicating a predetermined entity or an object term is removed. For example, as illustrated in FIG. 2, when writing related to a certain entity ABC is included in the corpus 30, the corpus for learning 32 does not include "ABC" while the corpus for learning 31 includes "ABC."

Any of machine learning by the model for terms 21 and machine learning by the model for writing 22 may be executed first, or these may be executed simultaneously in parallel.

When it is assumed to use the corpus for learning 31 in machine learning of both of the model for terms 21 and the model for writing 22, it is possible to reduce a learning period by executing machine learning by one model substantially including characteristics of both of the model 21 and the model 22. That is, this one model is a model, from which both of features of terms and features of pieces of writing are acquired, and corresponds to the model for terms 21 and the model for writing 22. For example, both of word vectors and paragraph vectors are originally acquired in PV-DM. Even in PV-DBOW, it can be made possible to acquire word vectors in addition to paragraph vectors optionally. Since it is only necessary to prepare one corpus as a corpus for learning, time and effort to prepare a corpus are reduced.

The classifier generation unit 113 generates the classifier 2 including the model for terms 21, the model for writing 22, and the determination unit 23. The determination unit 23 is, for example, a program code to determine linking of an object term based on the first candidate information output from the model for terms 21 and the second candidate information output from the model for writing 22. A detail of the determination unit 23 will be described later.

[2-2. Linking]

Figure 3:
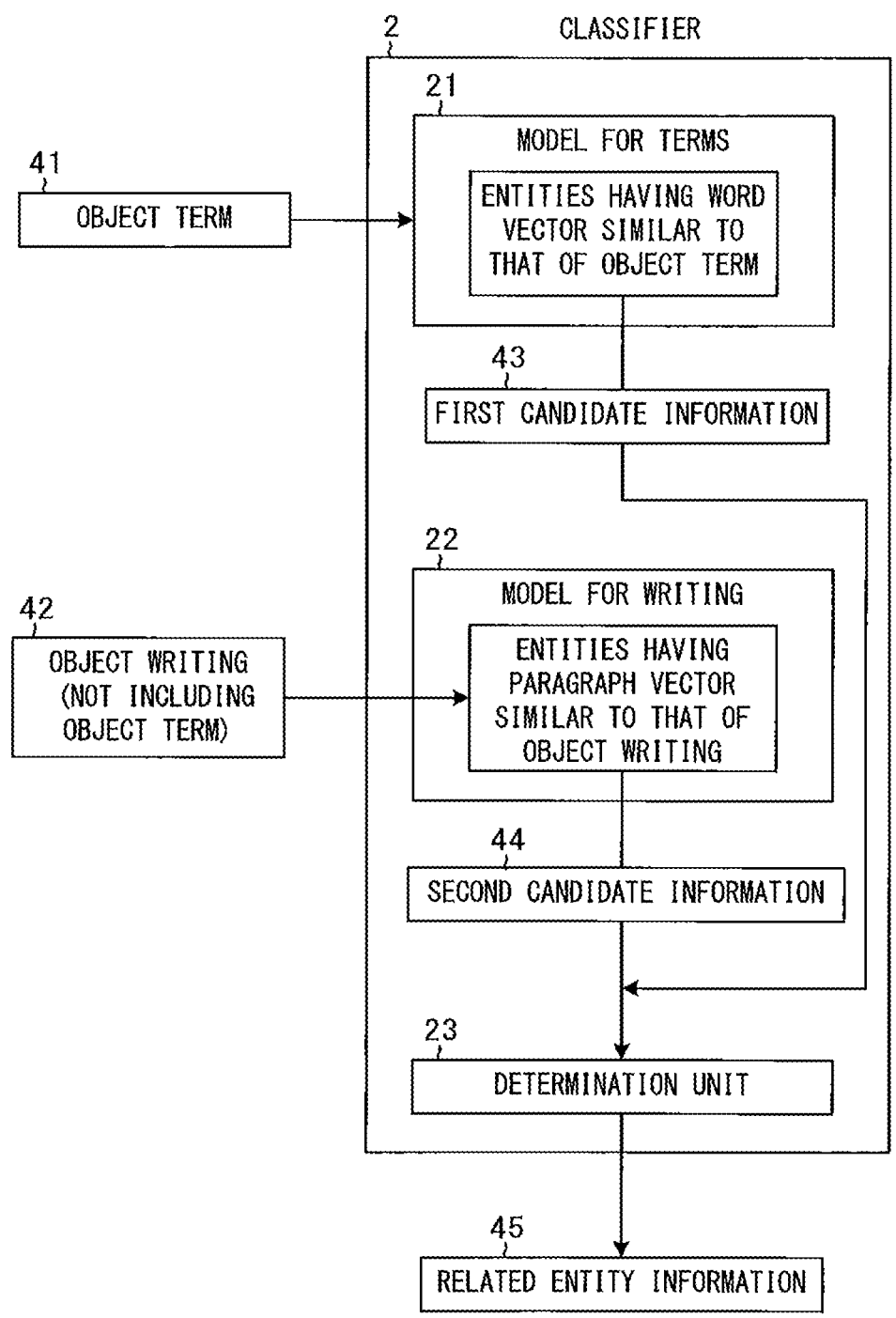
FIG. 3 is a view illustrating an example how linking is executed.

Next, a method of linking using the classifier 2 generated by the above-described method will be described. FIG. 3 is a view illustrating an example how linking is executed.

As illustrated in FIG. 3, object writing 42 is acquired while being linked to an object term 41. A source from which the object writing is acquired is not specifically limited. Preprocessing on the object writing 42 is performed, for example, by a method as same as that of the corpus 30. Also, the object writing 42 from which at least one of terms indicating predetermined entities or an object term is removed may be input into the classifier 2. In addition, at least one of terms indicating predetermined entities or an object term may be removed from the object writing 42 and then the object writing 42 may be input into the classifier 2. A reason of this is similar to the reason why machine learning is performed by using the corpus for learning 32 as described above. The object term 41 and the object writing 42 are input into the classifier 2.

The term model control unit 114 causes the model for terms 21 to output, in response to an input of an object term, first candidate information indicating one or more entities indicated by one or more respective terms, which have similarity in a feature to the object term, among one or more terms indicating one or more predetermined respective entities. For example, the model for terms 21 acquires a word vector of the object term. When the object term includes a plurality of words, the model for terms 21 acquires a word vector of each of this plurality of words and acquires a word vector of the object term by a predetermined arithmetic operation with respect to these word vectors. Examples of the predetermined arithmetic operation include addition, averaging, and the like. Accordingly, even when the corpus 30 does not include the object term, it is possible to acquire a word vector of the object term. The model for terms 21 calculates similarity between the word vector of the object term and a word vector of each predetermined entity. This similarity may be, for example, cosine similarity. Then, the model for terms 21 determines, as candidate entities, N1 entities (N1 is an integer satisfying N1>0 and the number of the entities), the number of which is, having relatively high similarity or entities having similarity equal to or higher than a predetermined threshold among the predetermined entities. Then, the model for terms 21 outputs first candidate information indicating the entities determined as the candidates. For example, linking may be executed by using a corpus for testing, and N1 or the threshold may be determined based on a result thereof.

The writing model control unit 115 causes the model for writing 22 to output, in response to an input of object writing, second candidate information indicating one or more entities related to one or more respective pieces of writing, which have similarity in a feature to the object writing, among one or more pieces of writing related to one or more predetermined respective entities. For example, the writing model control unit 115 executes machine learning of the model for writing 22 using object writing, and acquires a paragraph vector of the object writing. The number of times of learning in this case may be small. The model for writing 22 itself (such as weight or bias) is not changed by this machine learning. The model for writing 22 calculates similarity between a paragraph vector of the object writing and a paragraph vector of writing related to each predetermined entity. This similarity may be, for example, cosine similarity. Then, the model for writing 22 determines, as candidate entities, N2 entities (N2 is integer satisfying N2>0 and the number of the entities) having relatively high similarity or entities having similarity equal to or higher than a predetermined threshold in the predetermined entities. Then, the model for writing 22 outputs second candidate information indicating the entities determined as the candidates. For example, linking may be executed by using a corpus for testing and N2 or the threshold may be determined based on a result thereof.

Any of the output of the first candidate information by the model for terms 21 and the output of the second candidate information by the model for writing 22 may be executed first, or these may be simultaneously executed in parallel. When the output of first candidate information is executed first, the model for writing 22 may determine, with the first candidate information as an input, N2 entities having relatively high similarity in a paragraph vector or entities having similarity equal to or higher than a predetermined threshold as candidates entities among from entities indicated by the first candidate information, and output the second candidate information. When the output of second candidate information is executed first, the model for terms 21 may determine, with the second candidate information as an input, N1 entities having relatively high similarity in a word vector or entities having similarity equal to or higher than a predetermined threshold as candidate entities among from entities indicated by the second candidate information, and output the first candidate information. A condition of determining which is executed first is not limited to a specific condition. However, for example, determination may be made based on linking accuracy (estimation accuracy) of a case where linking is performed by using each of the model for terms 21 or the model for writing 22 alone. For example, an output of candidate information by a model with higher accuracy is executed first and, with this candidate information as an input, an output of candidate information by the other model is subsequently executed. Accordingly, since probability that candidates extracted by the first model include an entity that is truly related to the object term becomes high, final estimation accuracy can be improved.

In a case where the one model including characteristics of both of the model for terms 21 and the model for writing 22 is generated, each of the first candidate information and the second candidate information is output by this model.

The output control unit 116 causes the determination unit 23 to determine linking of the object term based on the first candidate information and the second candidate information. Determination of linking of the object term may include determination to which predetermined entity the object term is linked, and determination whether to link the object term to a predetermined entity. For example, the determination unit 23 may determine, as a related entity, an entity indicated by both of the first candidate information and the second candidate information.

Alternatively, the determination unit 23 may determine, as related entities, N3 entities (N3 is integer satisfying N3>0 and the number of the entities) having relatively high similarity in a word vector to the object term or similarity in a paragraph vector to the object writing, or entities having similarity equal to or higher than a predetermined threshold among the entity indicated by both of the first candidate information and the second candidate information. For example, linking may be executed by using a corpus for testing and N3 or the threshold may be determined based on a result thereof. In a case where an output of candidate information by one model between the model for terms 21 and the model for writing 22 is executed first and, with this candidate information as an input, an output of candidate information by the other model is subsequently executed, the determination unit 23 determines linking of the object term based on the candidate information output from the other model. For example, a related entity is determined among from entities indicated by the candidate information output from the other model. Even in this case, it is obvious that linking of the object term is determined based on the first candidate information and the second candidate information. In such a manner, since the related entity is determined based on both of similarity in features of terms and similarity in features of pieces of writing, it is possible to improve accuracy of estimating a related entity even when there are many predetermined entities that are candidates for a linked entity. In a case where the related entity is determined, related entity information indicating the determined related entity is output. When there is no related entity (when the object term is not linked to any entity), related entity information indicating that there is no related entity is output.

By such a classifier 2, the above-described problem is solved. More specifically, the first problem due to polysemy of the object term is solved mainly by using the model for writing 22. In a case where it is assumed that linking is performed by using only of features of terms (word vectors), even when a term indicates a different entity depending on writing on which the term appears, a feature of the term does not reflect this. Thus, it is difficult to appropriately link the term having polysemy. On the other hand, according to the model for writing 22, it is possible to appropriately link the term having polysemy since features of pieces of writing on which the term appears (paragraph vectors) are used. The second problem due to ambiguity of an entity is solved mainly by using the model for terms 21. According to the model for terms 21, a feature considering various contexts on which the term appears is acquired as a feature of the term. Thus, from the point, it is possible to appropriately link a plurality of object terms to one entity having ambiguity. The third problem due to uncertainty of existence of a related entity is solved mainly by using the model for writing 22. As described above, a term may indicate a different entity depending on writing on which the term appears. According to the model for writing 22, it is possible to appropriately estimate whether an entity truly indicated by the term exists in the predetermined entities by using a feature of writing on which the term appears.

Also, as described above, while it is difficult to appropriately link a term having polysemy when linking is performed by using only features of terms, there is a possibility that accuracy of extracting entities to be candidates for an entity related to the object term is decreased when linking is performed by using only features of pieces of writing. According to the classifier 2, both of features of terms and features of pieces of writing are used. Thus, even when quantity or quality of information of object writing is greatly lower than quantity or quality of information of the corpus for learning 31, it is possible to improve accuracy of linking without using training data, or a dictionary to solve notation fluctuation of a term.

[3. Operation of Classification Device]

Figure 4:
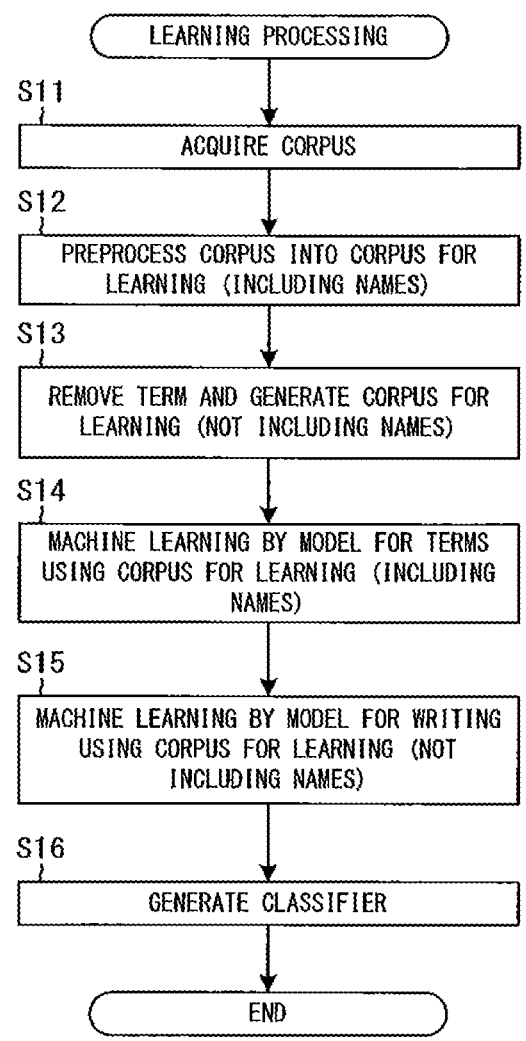
FIG. 4 is a flowchart illustrating an example of learning processing by the system control unit 11 of the classification device 1.

Next, an operation of the classification device 1 will be described with reference to FIG. 4 and FIG. 5. FIG. 4 is a flowchart illustrating an example of learning processing by the system control unit 11 of the classification device 1. According to a program for generating a classifier, the system control unit 11 executes learning processing. As illustrated in FIG. 4, the system control unit 11 acquires the corpus 30 through a network or from a recording medium or the like based on operation by an operator (Step S11). Then, the system control unit 11 generates the corpus for learning 31 by preprocessing the corpus 30 (Step S12). The system control unit 11 associates each piece of writing included in the corpus for learning 31 with each predetermined entity. Then, the system control unit 11 removes, from each piece of writing included in the corpus for learning 31, a term indicating a predetermined entity associated with the writing and generates the corpus for learning 32 (Step S13). Then, the term model generation unit 111 generates the model for terms 21 by executing machine learning using the corpus for learning 31 (Step S14). In addition, the writing model generation unit 112 generates the model for writing 22 by executing machine learning using the corpus for learning 32 (Step S15). After Step S14 and S15, the classifier generation unit 113 generates the classifier 2 including the model for terms 21, the model for writing 22, and the determination unit 23 and stores this in the storage unit 14 (Step S16), and ends the learning processing.

Figure 5:
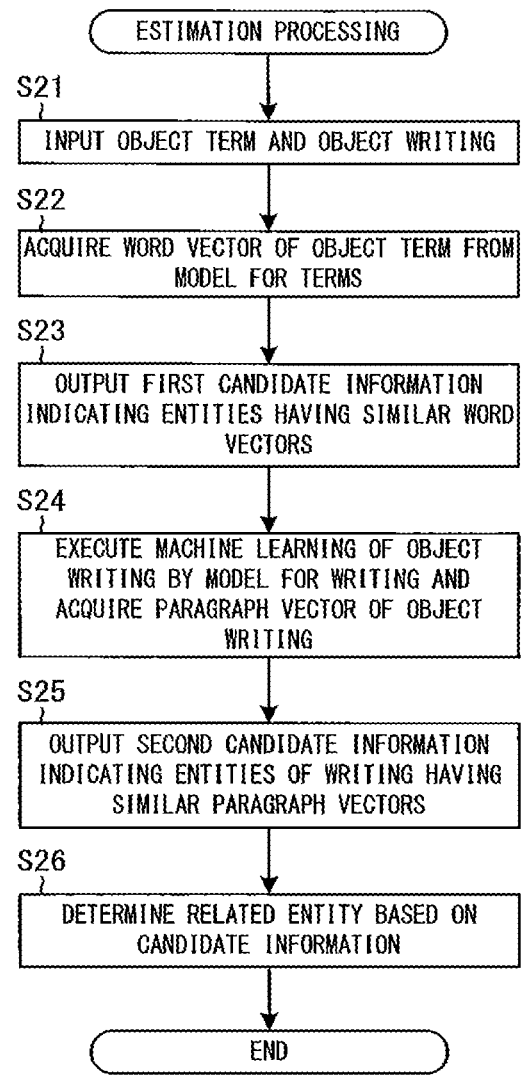
FIG. 5 is a flowchart illustrating an example of linking processing by the system control unit 11 of the classification device 1.

FIG. 5 is a flowchart illustrating an example of linking processing by the system control unit 11 of the classification device 1. According to a program for linking, the system control unit 11 executes linking processing. As illustrated in FIG. 5, the system control unit 11 loads the generated classifier 2 from the storage unit 14 into the RAM 11c and receives an input of a set of an object term and object writing based on operation by an operator (Step S21). Note that a list of a plurality of object terms and a corpus including pieces of object writing corresponding to these may be input. Then, the term model control unit 114 acquires a word vector of the object term by using the model for terms 21 (Step S22). When the object term includes a plurality of words, the term model control unit 114 acquires a word vector of the object term by acquiring a word vector of each word and performing a predetermined arithmetic operation. Then, by using the model for terms 21, the term model control unit 114 calculates similarity between the word vector of the object term and a word vector of a term indicating each predetermined entity, and causes first candidate information indicating entities having relatively high similarity to be output (Step S23). Then, the writing model control unit 115 acquires a paragraph vector of the object writing by executing machine learning by the model for writing 22 by using the object writing (Step S24). Then, by using the model for writing 22, the writing model control unit 115 calculates similarity between the paragraph vector of the object writing and a paragraph vector of writing related to each predetermined entity, and causes second candidate information indicating entities having relatively high similarity to be output. Then, the output control unit 116 causes the determination unit 23 to determine linking of the object term based on the first candidate information and the second candidate information and to output related entity information (Step S26). When Step S26 is ended, the system control unit 11 ends the linking processing. Note that in a case where the list of object terms and the corpus are input, Steps S22 to S26 are executed for each set of an object term and object writing.

As described above, according to the present embodiment, the system control unit 11 stores, in the RAM 11c, a model for terms 21 generated by machine learning using a corpus including one or more pieces of writing related to one or more respective predetermined entities and from which features of terms included in the writing related to the predetermined entities is acquired, and a model for writing 22 generated by machine learning using a corpus including writing related to a predetermined entity and from which a feature of the writing related to the predetermined entity is acquired. Also, the system control unit 11 causes the stored model for terms 21 to output, in response to an input of an object term included in given object writing, first candidate information indicating one or more entities indicated by one or more respective terms, which have similarity in a feature to the object term, among one or more terms indicating one or more respective predetermined entities. Also, the system control unit 11 causes the stored model for writing 22 to output, in response to an input of object writing, second candidate information indicating one or more entities related to one or more respective pieces of writing, which have similarity in a feature to the object writing, among pieces of writing related to predetermined entities. In addition, the system control unit 11 determines linking of the object term based on the output first candidate information and the output second candidate information. Thus, even when there are many candidates for an entity related to a term in given object writing, accuracy of estimating an entity related to an object term that appears on the object writing can be improved.

In addition, the model for writing 22 may be generated by using a corpus that is a corpus which is used in generation of the model for terms 21 and from which terms indicating predetermined entities are removed. In addition, the system control unit 11 may cause this the model for writing 22 to output second candidate information. In this case, by the removal of terms indicating predetermined entities, a feature based on a wider context with a distance from the term itself is acquired from the model for writing 22 with respect to writing related to the predetermined entity. Thus, entity with a feature of related writing being similar to a feature of object writing can be appropriately extracted.

In addition, a corpus used for generation of the model for writing 22 may be identical to the corpus for learning 31 used for generation of the model for terms 21. By using the corpus for learning 31, a model from which both of features of terms included in pieces of writing related to a predetermined entity and features of the pieces of writing are acquired may be generated as a model corresponding to the model for terms 21 and the model for writing 22. In addition, the system control unit 11 may cause this model to output first candidate information and to output second candidate information. In this case, since it is only necessary to generate one model, it is possible to reduce learning time compared to a case where both of the model for terms 21 and the model for writing 22 are generated. In addition, it is possible to reduce time and effort to prepare a corpus.

In addition, the system control unit 11 may cause the model for writing 22 to output second candidate information indicating entities related to piece of writing, which have relatively high similarity in a feature to object writing, in pieces of writing related to entities indicated by first candidate information output from the model for terms 21. In addition, the system control unit 11 may determine linking of an object term based on the second candidate information. In this case, when accuracy of extracting an entity truly related to the object term as a candidate of a related entity is higher in the model for terms 21 than in the model for writing 22, final estimation accuracy can be improved.

Also, when features of terms included in writing related to a predetermined entity is acquired in a unit of a word from the model for terms 21 and an object term includes a plurality of words, the model for terms 21 may calculate a feature of the object term by a predetermined arithmetic operation with respect to a feature of each of this plurality of words. In this case, even when the object term itself is not included in the corpus for learning 31, a feature of the object term can be acquired.

In addition, by machine learning using object writing, the model for writing 22 may acquire a feature of this object writing when outputting second candidate information. In this case, even when the corpus for learning 31 does not include writing identical to object writing, a feature of the object writing can be acquired.

EXAMPLES

First Example

Next, an example of a case where a listed company related to a manufacturer name is estimated with a manufacturer name as an object term and a listed company as a predetermined entity will be described with reference to FIG. 6 to FIG. 7B. Object listed companies are about 2000 listed companies on Wikipedia (registered trademark) and object manufacturers are about 70000 manufacturers on a sale item price site (Shohin Kakaku Navi (registered trademark)) run by the applicant. Information related to items for sale that are provided by the manufacturers is on this site. There is a case where a certain manufacturer is a company identical to a certain object listed company, a subsidiary of the object listed company, or the like. In addition, there is a case where a certain manufacturer is not related to any of object listed companies.

Figure 6:
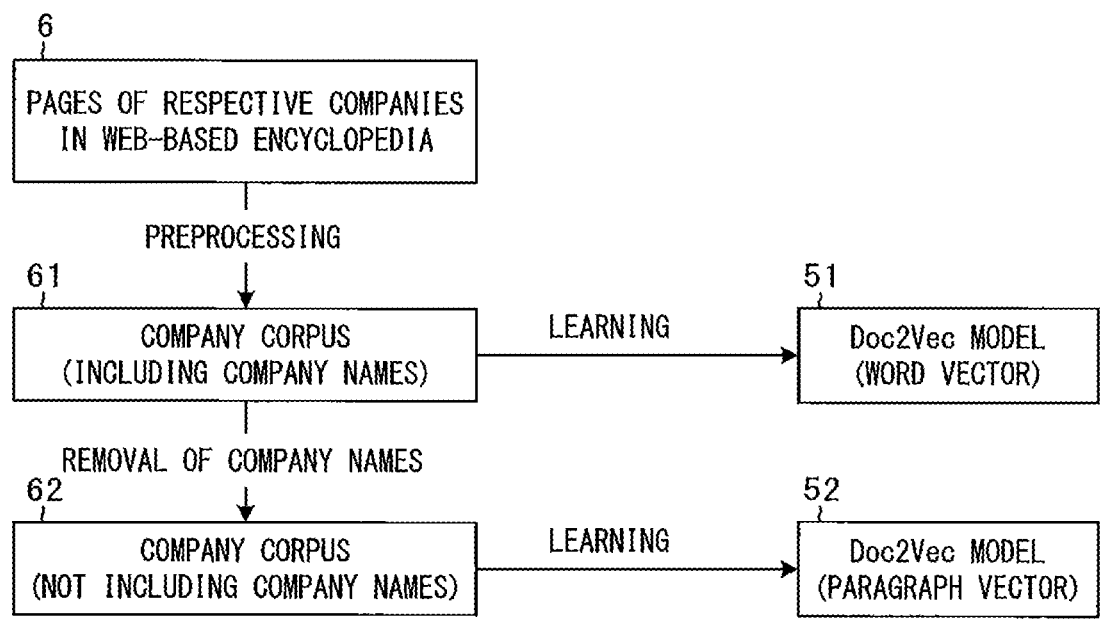
FIG. 6 is a view illustrating an example of a generation method of a classifier 5 in one example.

FIG. 6 is a view illustrating an example of a generation method of a classifier 5 in the present example. First, as writing related to each listed company, a page 6 of each listed company is acquired from Wikipedia (registered trademark). In addition, in order to supplement information, a page of cooperate information, business introduction, or the like is acquired from a website of each listed company. A company corpus 61 is generated by a removal of an HTML tag, a Javascript (registered trademark) code, and the like and performing preprocessing in a manner described in the embodiment with respect to the acquired page. The company corpus 61 includes a name of each listed company. In addition, a company corpus 62 is generated by a removal of each listed company name from the company corpus 61.

With respect to each of a Doc2Vec model 51 as a model for terms 21 and a Doc2Vec model 52 as a model for writing 22, PV-DBOW is employed. With respect to each model, a window size is set to 5, a size of an intermediate layer is set to 300, and the number of epochs is set to 10. The Doc2Vec model 51 is generated by machine learning using the company corpus 61, and the Doc2Vec model 52 is generated by machine learning using the company corpus 62.

Figures 7A, 7B:
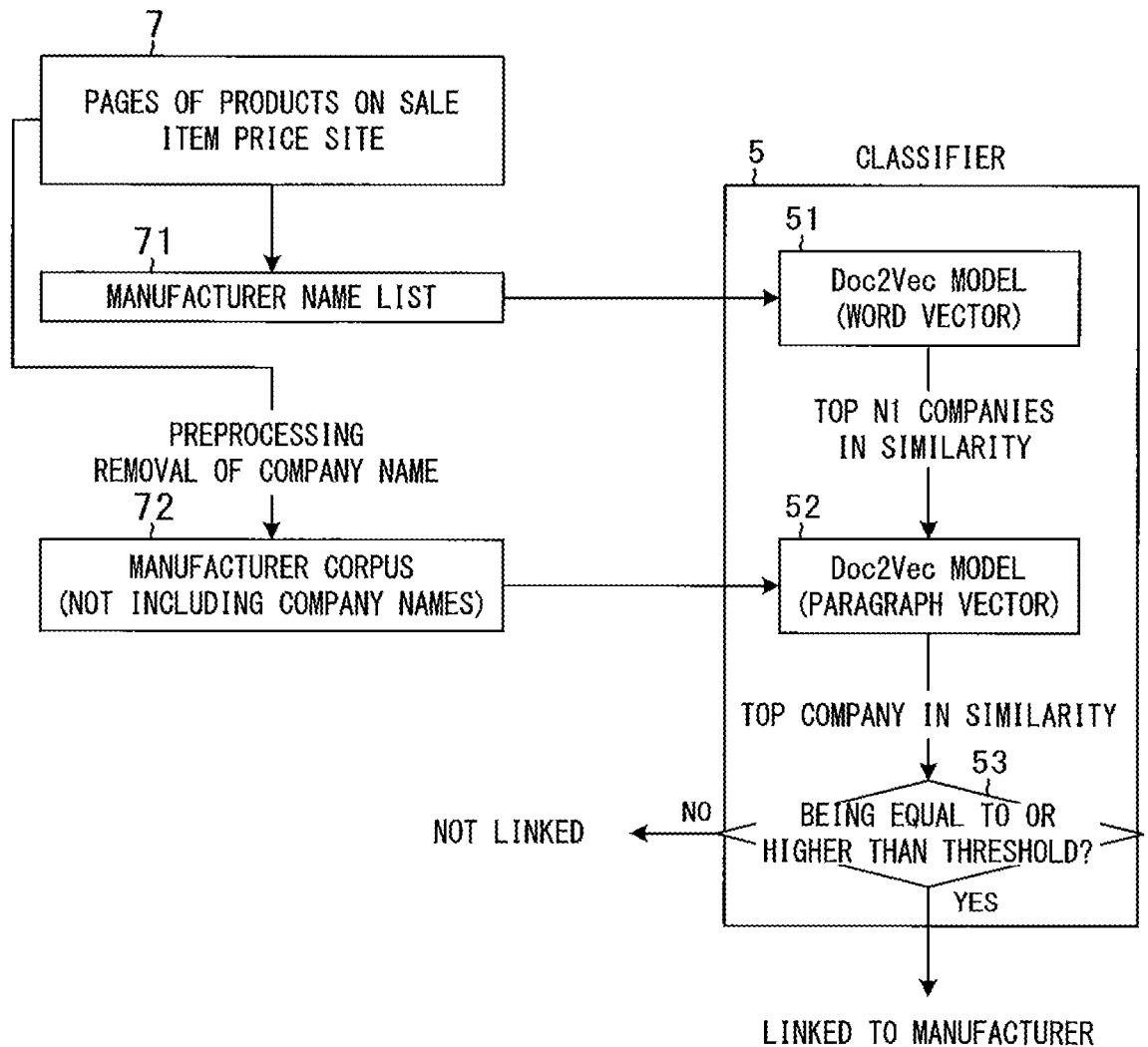
FIG. 7A is a view illustrating an example of an estimation method of a listed company related to a manufacturer name.
FIG. 7B is a view illustrating a result of an evaluation experiment.

FIG. 7A is a view illustrating an example of an estimation method of a listed company related to a manufacturer name. As object writing, a page 7 on which information of major four products provided by a manufacturer is posted is acquired with respect to each manufacturer from the sale item price site. Similarly to the company corpus 62, a manufacturer corpus 72 is generated by performing preprocessing and a removal of a listed company name with respect to the acquired page. Moreover, a list 71 of a manufacturer name is generated.

In the present example, estimation by the Doc2Vec model 51 is performed in a first stage, and first candidate information output from this model is used as an input of the Doc2Vec model 52. Then, estimation by the Doc2Vec model 52 is performed in a second stage, and second candidate information output from this model is used as an input of a determination unit 53.

When the list 71 is input into the Doc2Vec model 51, first candidate information indicating N1 listed companies having high similarity in a word vector is acquired with respect to each manufacturer name. Accordingly, even when a notation of a name is not similar, a listed company with a context on which the name appears being similar to that of a manufacturer is extracted as a candidate. Then, the manufacturer corpus 72 is input into the Doc2Vec model 52, and one company, which has the highest similarity in a paragraph vector of writing with respect to each manufacturer, among listed companies indicated by the first candidate information is set as a candidate company here. When notations of a certain manufacturer name and a listed company name are identical or similar, there is a possibility that similarity between word vectors of these names becomes high. However, there is a case where there is actually no relevance between the manufacturer and the listed company. Since similarity in a paragraph vector is used in the second stage, probability that similarity in writing becomes low is high even in such a manufacturer and listed company. Thus, it is possible to reduce an estimation error. Moreover, since the company corpus 62 from which listed company names are removed and the manufacturer corpus 72 from which listed company names are removed are used, meanings of these terms are interpreted from a wider context with a distance from a listed company name itself. In addition, it is possible to suppress similarity in a paragraph vector from becoming high due to an identical or similar notation of a name although a listed company is not related to an object manufacturer.

The determination unit 53 links, with respect to a listed company having the highest similarity in a paragraph vector calculated in the Doc2Vec model 52, the listed company to an object manufacturer name when the similarity exceeds a threshold. On the one hand, when the similarity is equal to or lower than the threshold, the listed company is not linked to the object manufacturer name. That is, no listed company is linked to the object manufacturer name.

FIG. 7B is a view illustrating a result of an evaluation experiment. In the experiment, estimation accuracy is compared with respect to text-matching, a system using only a Doc2Vec model in one stage, and a system using a Doc2Vec model in two stages as comparison examples in addition to a system of the present example. As a manufacturer corpus for the evaluation experiment, a corpus including writing of 200 companies is used. In the text-matching, when first five characters of a manufacturer name and a listed company name are identical, the manufacturer name and the listed company are linked. In addition, an optimal value is calculated in an exploratory manner as a threshold used for the experiment. In addition, the number N1 of candidates extracted by the Doc2Vec model 51 is one. With respect to the systems other than the system of the present example, the company corpus 61 including company names is used, instead of the company corpus 62, as a corpus for learning of the Doc2Vec model to acquire a paragraph vector, and a corpus including listed company names is used as a corpus for testing.

As illustrated in FIG. 7B, estimation accuracy of text-matching is 52.5%. Next, estimation accuracy of a system that performs linking based on similarity of a paragraph vector by using only the Doc2Vec model in one stage is 46.0%. Estimation accuracy of a system that performs linking based on similarity of a word vector by using only the Doc2Vec model in one stage is 71.5%.

Estimation accuracy of a system thawritingracts candidate listed companies based on similarity in a paragraph vector by using the Doc2Vec model in the first stage and that performs estimation by narrowing down the candidates based on similarity in a word vector by using the Doc2Vec model in the second stage is 61.5%. Estimation accuracy of a system thawritingracts candidate listed companies based on similarity in a word vector by using the Doc2Vec model in the first stage and that performs estimation by narrowing down the candidates based on similarity in a paragraph vector by using the Doc2Vec model (generated by using company corpus 61 including listed company names) in the second stage is 78.5%. In these systems each include two stages, a reason why the latter system has higher estimation accuracy is that accuracy of extracting a truly related listed company as a candidate in the Doc2Vec model in the first stage is higher in the latter system than in the former system. One factor of low accuracy of extracting a candidate by using a paragraph model is that an amount of information related to a manufacturer on a sale item price site is relatively small. It is considered that estimation accuracy is improved depending on a writing group used as a manufacturer corpus.

Finally, estimation accuracy of the system of the present example is 83.5%. In such a manner, according to the system of the present example, superior estimation accuracy is acquired compared to the other systems.

Second Example

Next, an example of a case of estimating, with a place name appearing on certain writing as an object term and places as predetermined entities, which place is indicated by the place name. There is a case where different places are indicated even when notations of place names are identical.

For example, Chinese characters "Shinjuku" can be read as both of "Shinjuku" and "Niijuku." While "Shinjuku" is a way of reading of a name of a certain ward in Tokyo, "Niijuku" is a way of reading of a name of a certain town in a Katsushika ward in Tokyo. In addition, for example, even when notations of a place name are different in a daily-use Chinese character, an old Chinese character, a Japanese syllabary character, and the like, there is a case where the same place is indicated.

For example, pieces writing related to respective various places are acquired as a corpus 30. An acquisition source may be, for example, a web-based encyclopedia, or the like. This corpus is preprocessed in a manner described in the embodiment and thereby a corpus for learning 31 is generated. A model for terms 21 is generated by machine learning using the corpus for learning 31. In addition, a model for writing 22 may be generated by machine learning using the corpus for learning 31. However, it is preferable that a corpus for learning 32 is generated by removal of place names from the corpus for learning 31 and a model for writing 22 is generated by using the corpus for learning 32.

After generation of a classifier 2, writing including a place name such as writing referring to a place indicated by the place name, or the like is acquired as object writing. An acquisition source of the object writing is not specifically limited. The object place name is input into the model for terms 21 and first candidate information indicating places having relatively high similarity in a word vector is acquired. Accordingly, even a place having a notation different from that of the object place name can be extracted as a candidate of a related place. In addition, writing in which the object place name is removed from the object writing is input into the model for writing 22 and second candidate information indicating places having relatively high similarity in a paragraph vector is acquired. Accordingly, a place that has a notation identical or similar to that of the object place name but that is not related to the place name can be excluded from candidates. Then, related entity information indicating a place related to the object place name is acquired from a determination unit 23 based on the first candidate information and the second candidate information.

Accordingly, for example, it is possible to appropriately link Chinese characters "Shinjuku" that appears on object writing to any of Shinjuku ward and Niijuku in Katsushika ward from a context of the object writing. In addition, when Japanese syllabary characters "Tokyo" appear in object writing while only Chinese characters "Tokyo" are included as a term indicating Tokyo in writing about Tokyo in the corpus 30, it is possible to appropriately link these Japanese syllabary characters "Tokyo" to Tokyo.

Third Example

Next, in a system of managing writing, which is created and registered or posted by a user, in association with an account (or ID) of the user, an example of a case where identity of a creator of writing is estimated with the writing registered in this system as a corpus 30 will be described. Such a system is not limited to a specific system, and examples thereof include a social networking service (SNS), an e-commerce site, a review site, a viral site, and the like. Object writing is not specifically limited as long as being described by a user and is, for example, comment, a review, feedback, a tweet, information of an item for sale that is sold by a user, a writing work, or the like.

An example of estimating identity of a creator of writing includes estimating whether a creator of a part of writing and a creator of the other writing are actually different in a plurality of pieces of writing created by the same account. That is, spoofing, ghost-writing, or the like in a part of writing is estimated. A different example is estimating whether users of different accounts are actually the same person. That is, it is estimated whether the same person has a plurality of accounts.

A predetermined entity in the present example is a subject, a theme, or the like indicated by a title of writing. A title summarizes writing contents. In addition, writing mainly refers to a subject, a theme, or the like.

As a corpus 30, one or more pieces of writing registered with respect to one or more respective accounts are acquired from the system. A corpus for learning 31 is generated by preprocessing this corpus in a manner described in the embodiment. It is made possible to acquire a word vector of a title of writing by generation of a model for terms 21 by machine learning using the corpus for learning 31. When a title includes a plurality of words, a word vector of the title may be acquired by an arithmetic operation such as addition or averaging of word vectors of this plurality of respective words. When a plurality of pieces of writing is registered with respect to one account, a representative value of word vectors of titles of this plurality of pieces of writing is calculated and associated with the account. A representative value may be, for example, an average value or the like.

A corpus for learning 32 is generated by removal of a title of writing from the corpus for learning 31. However, there are not many cases where a title itself is included in writing. Thus, actually, it is only necessary to generate the corpus for learning 32 by a removal of each word included in the title. Then, it is made possible to acquire a paragraph vector of writing by generation of a model for writing 22 by machine learning using the corpus for learning 32. When a plurality of pieces of writing is registered with respect to one account, a representative value of paragraph vectors of this plurality of pieces of writing is calculated and linked to the account.

An object term is a title of object writing. A word vector of a title of the object writing is acquired from the model for terms 21 by a method as same as the above-described method.

Next, an example of a method of estimating whether a creator of a part of writing and a creator of the other writing are different in a plurality of pieces of writing created by the same account will be described. For example, by any condition or method, an object account is previously designated and one piece of writing in writing created by the designated account is acquired as object writing from the corpus for learning 31. Alternatively, writing newly registered into the system after generation of the model for terms 21 and the model for writing 22 may be acquired as object writing. Similarity between a word vector of a title of the object writing and a representative value of word vectors associated with the designated account is calculated by the model for terms 21. In addition, similarity between a paragraph vector of the object writing and a representative value of paragraph vectors associated with the designated account is calculated by the model for writing 22. Then, based on the similarity in the word vector and the similarity in the paragraph vector, it is estimated whether a creator of the object writing and a creator of the other writing are the same. For example, estimation of being the same person may be made when the similarity in the word vector is equal to or higher than a predetermined first threshold and similarity in a paragraph vector is equal to or higher than a predetermined second threshold, and estimation of not being the same person may be made in the other case. Alternatively, a predetermined function may be calculated by substitution of the similarity in the word vector and the similarity in the paragraph into an expression of the function, and estimation may be made based on a value of the function.

Next, an example of a method of estimating whether users of different accounts are the same person will be described. For example, an object account is previously designated by any condition or method. It is assumed that writing created by the designated account is included in the corpora for learning 31 and 32. Similarity between a representative value of word vectors associated with the designated account and a representative value of word vectors associated with each of the other accounts is calculated by the model for terms 21. N1 accounts having relatively high similarity in the word vector among the other accounts are extracted as candidates. In addition, similarity between a representative value of paragraph vectors associated with the designated account and a representative value of paragraph vectors associated with each of the other accounts is calculated by the model for writing 22. N2 accounts having relatively high similarity in the word vector among the other accounts are extracted as candidates. Then, for example, identity with a user of the designated account is estimated from users in the candidates extracted by the model for terms 21 and the candidate extracted by the model for writing 22. For example, when there is an account in which similarity in a word vector is equal to or higher than a predetermined first threshold and similarity in a paragraph vector is equal to or higher than a predetermined second threshold, it may be estimated that a user of the account and the user of the designated account are the same person. When there is no such an account, it may be estimated that there is no same person with respect to the user of the designated account. Alternatively, a predetermined function may be calculated by substitution of similarity in a word vector and similarity in a paragraph with respect to each account into an expression of the function, and estimation may be performed based on a value of the function.

As described above, it is possible to estimate a spoofing post or whether the same user has a plurality of accounts.

REFERENCE SIGNS LIST 1 classification device
11 system control unit
12 system bus
13 input/output interface
14 storage unit
15 communication unit
16 input unit
17 display unit
111 term model generation unit
112 writing model generation unit
113 classifier generation unit
114 term model control unit
115 writing model control unit
116 output control unit
2 classifier
21 model for terms
22 model for writing
23 determination unit

The invention claimed is:

1. A classification device comprising:
at least one memory configured to store computer program code;
a storage that stores a first model which is generated by machine learning using a first corpus including one or more pieces of first writing related to one or more respective predetermined entities, and a second model which is generated by machine learning using a second corpus including the one or more pieces of first writing, wherein
the first model is configured to acquire, based on the first corpus, features of terms included in the one or more pieces of first writing using word vectors, each word vector of a corresponding term being based on a feature of the corresponding term, and
the second model is configured to acquire, based on the second corpus, features of the one or more pieces of first writing using paragraph vectors, each paragraph vector of a corresponding piece of first writing being based on a context in which each term included in the corresponding piece of first writing is used or terms used around each term are used; and
at least one processor configured to access said computer program code and operate as instructed by the computer program code, the computer program code including:
first control code configured to cause at least one of the at least one processor to cause the stored first model to output, in response to an input of a second term that is included in given second writing, first information indicating one or more first entities indicated by one or more respective terms, which have similarity in a feature to the second term, among one or more first terms indicating the one or more respective predetermined entities;
second control code configured to cause at least one of the at least one processor to cause the stored second model to output, in response to an input of the second writing, second information indicating one or more second entities related to one or more respective pieces of writing, which have similarity in a feature to the second writing, among the one or more pieces of first writing; and
determination code configured to cause at least one of the at least one processor to determine linking of the second term to at least one of the one or more respective predetermined entities, based on the output first information and the output second information.

2. The classification device according to claim 1, wherein the first corpus includes the one or more first terms, and
the second corpus has been generated by removing the one or more first terms from the first corpus and does not include the one or more first terms.

3. The classification device according to claim 1, wherein the first corpus is the second corpus,
the first model is the second model, and both of the features of the terms included in the one or more pieces of first writing and the features of the one or more pieces of first writing are acquired from the first model, and
the second control code is configured to cause at least one of the at least one processor to cause the first model to output the second information.

4. The classification device according to claim 1, wherein the second control code is configured to cause at least one of the at least one processor to cause the second model to output the second information indicating the one or more second entities related to the one or more respective pieces of writing, which has relatively high similarity in a feature to the second writing, among the one or more pieces of writing related to the one or more first entities indicated by the first information output from the first model, and the determination code is configured to cause at least one of the at least one processor to determine linking of the second term based on the second information.

5. The classification device according to claim 1,
wherein the features of the terms included in the one or more pieces of first writing is acquired in a unit of a word from the first model, and the first model calculates, when the second term includes a plurality of words, a feature of the second term by a predetermined arithmetic operation with respect to a plurality of features of the plurality of respective words.

6. The classification device according to claim 1,
wherein when outputting the second information, the second model acquires a feature of the second writing by machine learning using the second writing.

7. The classification device according to claim 1,
wherein the linking of the second term includes determining an entity related to the second term among the one or more predetermined entities.

8. The classification device according to claim 1,
wherein the linking of the second term includes determining whether there is an entity related to the second term among the one or more predetermined entities.

9. The classification device according to claim 1,
wherein the determining code is configured to cause at least one of the at least one processor to determine an entity related to the second term among one or more third entities included in both of the one or more first entities and the one or more second entities.

10. The classification device according to claim 1,
wherein each word vector of the corresponding term is based on the feature of the corresponding term included in the one or more pieces of first writing without considering a context in which each term other than the corresponding term is used.

11. A classification method performed by a computer, the method comprising:
storing, in a storage, a first model which is generated by machine learning using a first corpus including one or more pieces of first writing related to one or more respective predetermined entities, the first model being configured to acquire, based on the first corpus, features of terms included in the one or more pieces of first writing using word vectors, each word vector of a corresponding term being based on a feature of the corresponding term;
storing, in the storage, a second model which is generated by machine learning using a second corpus including the one or more pieces of first writing, the second model being configured to acquire, based on the second corpus, features of the one or more pieces of first writing using paragraph vectors, each paragraph vector of a corresponding piece of first writing being based on a context in which each term included in the corresponding piece of first writing is used or terms used around each term are used;
causing the stored first model to output, in response to an input of a second term that is included in given second writing, first information indicating one or more first entities indicated by one or more respective terms, which have similarity in a feature to the second term, among one or more first terms indicating the one or more respective predetermined entities;
causing the stored second model to output, in response to an input of the second writing, second information indicating one or more second entities related to one or more respective pieces of writing, which have similarity in a feature to the second writing, among the one or more pieces of first writing; and
determining linking of the second term to at least one of the one or more respective predetermined entities, based on the output first information and the output second information.

12. A generation method executed by a computer, the method comprising:
generating a first model by machine learning using a first corpus including one or more pieces of first writing related to one or more respective predetermined entities, the first model being configured to acquire, based on the first corpus, features of terms included in the one or more pieces of first writing using word vectors, each word vector of a corresponding term being based on a feature of the corresponding term;
generating a second model by machine learning using a second corpus including the one or more pieces of first writing, the second model being configured to acquire, based on the second corpus, features of the one or more pieces of first writing using paragraph vectors, each paragraph vector of a corresponding piece of first writing being based on a context in which each term included in the corresponding piece of first writing is used or terms used around each term are used;
generating a classifier including the first model, the second model and a determination unit that determines linking of a second term that is included in given second writing; and
storing the generated classifier in a storage,
wherein the first model outputs, in response to an input of the second term, first information indicating one or more first entities indicated by one or more respective terms, which have similarity in a feature to the second term, among one or more first terms indicating one or more respective predetermined entities,
the second model outputs, in response to an input of the second writing, second information indicating one or more second entities related to one or more respective pieces of writing, which have similarity in a feature to the second writing, among the one or more pieces of first writing,
the determination unit determines linking of the second term to at least one of the one or more respective predetermined entities, based on the output first information and the output second information, and
the classifier is read from the storage, and the first model and the second model included in the read classifier are used to output the first information and the second information.

* * * * *